United States Patent [19]

Lichtin

[11] 4,427,509
[45] Jan. 24, 1984

[54] LIGHT DRIVEN PHOTOCATALYTIC PROCESS

[75] Inventor: Norman N. Lichtin, Newton Center, Mass.

[73] Assignee: Atlantic Richfield Company, Los Angeles, Calif.

[21] Appl. No.: 374,446

[22] Filed: May 3, 1982

[51] Int. Cl.³ .............................................. B01J 19/12
[52] U.S. Cl. ........................... 204/157.1 R; 204/158 R
[58] Field of Search ..................... 204/157.1 R, 162 R, 204/158 N

[56] References Cited

U.S. PATENT DOCUMENTS

| | | | |
|---|---|---|---|
| 4,094,751 | 6/1978 | Nozik | 204/157.1 R |
| 4,113,590 | 9/1978 | Schrauzer et al. | 204/157.1 R |
| 4,287,036 | 9/1981 | Tsutsui et al. | 204/157.1 R |

Primary Examiner—Howard S. Williams
Attorney, Agent, or Firm—Roderick W. MacDonald

[57] ABSTRACT

A method for the light driven photocatalytic reduction of nitrogen to one or more compounds which comprises contacting silicon with the nitrogen in the absence of separate physical electrolyte and electrodes, and conducting said contacting in the presence of light.

20 Claims, No Drawings

LIGHT DRIVEN PHOTOCATALYTIC PROCESS

BACKGROUND OF THE INVENTION

Heretofore, the photocatalytic reduction of carbon dioxide into various organic compounds such as formaldehyde and methanol has been accomplished using various chemical compounds such as titanium dioxide, tungsten trioxide, lead oxide, iron oxide, calcium titanate, silicon carbide, and the like. See "Photoreduction of Carbon Dioxide and Water into Formaldehyde and Methanol on Semiconductor Materials" by Aurian-Blajeni, Halmann and Manassen, Solar Energy, Vol. 25, pp. 165–170, 1980. This photocatalytic process does not employ any physically separate electrodes or special electrolyte as does the classical electrolytic cell or photoelectrochemical cells as will be discussed in greater detail hereinafter. This photocatalytic process merely employs a catalytic material, preferably, dispersed in a carrier liquid for better carbon dioxide contacting purposes. The material to be reduced such as carbon dioxide, is brought into contact with the catalyst using light as a source of the energy of reduction.

Heretofore, such photocatalytic processes have relied on chemical compounds rather than individual elements or metals based on thermodynamic considerations. For example, it was thought that silicon would not work in a photocatalytic context because, based on photoconductor theory, silicon (elemental silicon), when excited by photons would not have sufficient energy to reduce carbon dioxide in a water carrier.

Also heretofore, photoelectrochemical cells which employ two physically separate electrodes combined with a special electrolyte solution have been used to reduce carbon dioxide or the bicarbonate ion to organic compounds such as formaldehyde, methanol, and formic acid. These cells have employed silicon metal as one of the physically separate electrodes and carbon or the like as the counter electrode. In the operation of these cells at least part of the required energy of reduction is supplied by light energy, including solar radiation. See U.S. Pat. No. 4,219,392, issued Aug. 26, 1980 to Halmann.

Also heretofore, the photoreduction of nitrogen to ammonia has been reported using titanium dioxide alone or in combination with oxides of $Fe_2O_3$, cobalt, molybdenum, and nickel. See "Photolysis of Water and Photoreduction of Nitrogen on Titanium Dioxide", Journal of the American Chemical Society, Volume 99, pp. 7189–7193, 1977. This reference also discloses that enhancement of ammonia production was not obtained where numerous other metals such as chromium, copper, palladium, silver, and vanadium were used, thereby demonstrating the lack of predictability in this area.

BRIEF SUMMARY OF THE INVENTION

Accordingly, it was surprising to discover that silicon, whether semiconductor grade or not, does in fact act as a catalyst in a light driven photocatalytic process for the reduction of nitrogen.

There is provided, according to this invention, a method for the light driven photocatalytic reduction of nitrogen to at least one nitrogen containing compound which comprises contacting silicon (elemental silicon) with nitrogen or a nitrogen containing gas in the presence of light so that the energy of reduction is essentially supplied by said light.

This process distinguishes clearly over a photoelectro-chemical process in that the process of this invention requires no physically separate electrodes or special electrolyte and is unexpected in the photocatalytic context in that, contrary to prior beliefs, it has been found that silicon actually works as a catalyst, and does so even when the metal is not a semiconductor grade silicon.

Accordingly, it is an object of this invention to provide a new and improved light driven photocatalytic method. It is another object to provide a new and improved method for a light driven photocatalytic reduction of nitrogen to other useful compounds. Other aspects, objects and advantages of this invention will be apparent to those skilled in the art from this disclosure and the appended claims.

DETAILED DESCRIPTION OF THE INVENTION

In accordance with this invention, nitrogen is reduced to at least one nitrogen compound such as ammonia. The reduction is accomplished by contacting silicon with nitrogen and conducting such contacting in the presence of light so that the energy of reduction of the nitrogen is essentially supplied by said light.

Thus, the useful compounds produced by the method of this invention are obtained without the use of an external electrical bias, special electrodes, or special electrolyte solutions.

The light employed can be sunlight or artificial light or a combination of both and can vary over a wide wavelength range so long as at least part of the incident light is of a wavelength that is absorbed by the silicon employed. The time period for exposure to light can vary widely, there being no upper limit on the time of exposure from an operational point of view. The time limit for each exposure is dictated more by economics.

Although the mechanism is not yet understood to a certainty, it is thought that silicon can act as a net reducing agent by itself. However, additional reducing agents, e.g., water, can be employed to enhance the nitrogen reduction reaction.

It has been found that without incident light no measurable reduction takes place, and that with light and no silicon, no measurable reduction takes place, so that the combination of light and silicon along with a reducing agent is necessary.

The silicon employed can be semiconductor grade or not semiconductor grade. If semiconductor grade, the silicon can be either p-silicon, n-silicon, or both (p/n silicon). The semiconductor grade silicon used in this invention can be single crystal, polycrystalline or amorphous in form. All other forms of silicon are not semiconductor grade, e.g., metallurgical grade silicon, chemical grade silicon, and the like. It has also been found that silicon which is not semiconductor grade is operable in this invention. Thus, a wide range of silicon materials can be employed in this invention.

The silicon is preferably employed in a subdivided form, for example, a powder, in order to expose a larger catalyst contacting surface to the nitrogen. The extent of subdivision is not critical to the operability of the process, it being well within the skill of the art to determine whether coarse or fine particles or a combination thereof are to be employed in a particular application.

The nitrogen can be employed as essentially pure nitrogen gas or in mixture with other gases. For example, air can be employed as a source of nitrogen to be reduced in lieu of pure nitrogen gas.

The silicon may be employed without the aid of a carrier liquid, but the silicon can be dispersed in a carrier liquid to promote maximum contact between the silicon and the nitrogen to be reduced. This carrier liquid is not employed as an electrolyte but is rather a physical suspension and mixing medium for the silicon and nitrogen and, sometimes, as in the case of water, as a reducing agent. The carrier helps provide maximum mixing and intimate contact between the materials in the presence of light. The carrier liquid is not critical as to its chemical composition, so long as it is chemically nondeleterious to the silicon, the nitrogen to be reduced, and the reduction products. Preferably, the carrier liquid is common water. The water may or may not have one or more chemical salts dissolved therein, but, unlike an electrolyte, the carrier need not have dissolved salts therein to any appreciable extent so far as the operation of this invention is concerned.

Other reducing agents that can be employed are hydrogen sulfide, organic waste material such as sewage, vegetable matter or animal waste.

The amount of silicon and the amount and kind of any additional reducing agent employed in the process of this invention is not critical and can vary widely depending on economics and the like, the minimum criteria being only that an amount effective to obtain the desired reduction be present.

The silicon can simply be exposed to the nitrogen to be reduced or, optionally, can first be heat treated to increase its activity when subsequently exposed to the nitrogen to be reduced. It the silicon is heat treated prior to contact with the nitrogen to be reduced, it is preferably heated at a temperature of from about 20° C. to about 600° C. for at least one hour. The heating can be carried out in air or inert gas or in a vacuum, and is preferably conducted for from about one hour to about forty-eight hours.

In the following Example 1, the silicon was prepared by crushing to a fine powder under benzene in an agate mortar. In Example 2, the silicon was crushed in air without the presence of benzene. For both examples particles were subjected to a standard sieve analysis and particles in the 75 to 150 micrometer range were employed in the example runs.

In both examples, chemical grade nitrogen gas was used as the material to be reduced. The silicon was pretreated by heating under Argon for 12 hours at 100° C. Deionized tap water was employed as the reducing agent and carrier liquid.

The nitrogen was dispersed through a sintered disc into 25 milliliters of water carrying approximately 0.25 grams of the subdivided silicon dispersed therein. Bubbling of the nitrogen through this aqueous silicon suspension provided adequate mixing. The nitrogen flow rate was 60 cubic centimeters per minute at 1 atmosphere. The aqueous silicon suspension was contained in a pyrex reaction cell and a 150 watt Xenon lamp with quartz lenses was employed approximately 30 centimeters from the pyrex reaction cell to supply the incident light required for operation of the process.

Effluent gas from the reactor was passed through two traps containing small amounts of water and immersed in common ice.

The contents of the reactor and the traps were analyzed after each run for ammonia. The ammonia content was determined spectrophotometrically using Nessler's reagent.

EXAMPLE 1

Both semiconductor grade silicon and silicon that is not semiconductor grade were employed as set forth in Table I hereinafter.

The reaction time and temperature for all runs was approximately 30° C. and six hours.

TABLE I

| Run | Catalyst | Product Yield Ammonia, $\mu$moles/hr |
|---|---|---|
| 1 | Chemical Grade Silicon (Fisher) | 0.49 |
| 2 | Metallurgical Grade Silicon | 0.47 |
| 3 | p-Silicon (2 $\Omega$ cm)$^a$ | 1.21 |
| 4 | n-Silicon (1-2 $\Omega$ cm)$^a$ | 0.60 |
| 5 | p/n Silicon (NA)$^a$ | 0.86 |

$^a$Obtained from boron and/or phosphorus doped single crystal Czochralski boules.

EXAMPLE 2

In this example, metallurgical grade silicon was initially crushed in air as stated before. The run was then conducted for one hour at about 30° C. The result was 3.5$\mu$ moles/hour of ammonia.

Reasonable variations and modifications are possible within the scope of this disclosure without departing from the spirit and scope of this invention.

I claim:

1. A method for the light driven photocatalytic reduction of molecular nitrogen to at least one nitrogen containing compound which comprises contacting silicon with a hydrogen containing material and nitrogen in the absence of separate physical electrolyte and electrodes, and conducting said contacting in the presence of light so that the energy of reduction is essentially supplied by said light.

2. The method according to claim 1 wherein said light is one of artificial light, sunlight, or a combination thereof.

3. The method according to claim 1 wherein said nitrogen containing compound is ammonia.

4. The method according to claim 1 wherein said silicon is semiconductor grade silicon.

5. The method according to claim 4 wherein said silicon is p-silicon.

6. The method according to claim 4 wherein said silicon is n-silicon.

7. The method according to claim 1 wherein said silicon is not semiconductor grade silicon.

8. The method according to claim 7 wherein said silicon is metallurgical grade silicon.

9. The method according to claim 1 wherein said hydrogen containing material is water.

10. The method according to claim 9 wherein said silicon is dispersed in liquid water and said nitrogen to be reduced is carried to said silicon by said liquid.

11. The method according to claim 1 wherein said silicon is in subdivided form.

12. The method according to claim 11 wherein said silicon is subdivided into powder form.

13. The method according to claim 1 wherein said silicon is heat treated prior to contact with nitrogen by heating at a temperature of from about 20° C. to about 600° C. for at least one hour in either air, an inert gas, or a vacuum.

14. The method according to claim 13 wherein said heat treatment is for from about 1 hour to about 48 hours in argon or air.

15. The method according to claim 13 wherein said heat treatment is for from about 1 hour to about 48 hours in a vacuum.

16. The method according to claim 1 wherein said light has a wavelength range such that at least part of said light is absorbed by silicon.

17. The method according to claim 1 wherein said silicon is chemical grade silicon.

18. The method according to claim 1 wherein said silicon is amorphous silicon.

19. The method according to claim 1 wherein air is employed as the nitrogen source.

20. The method according to claim 1 wherein said hydrogen containing material is hydrogen.

* * * * *